United States Patent
Belomoev

(10) Patent No.: US 10,372,210 B2
(45) Date of Patent: Aug. 6, 2019

(54) DEVICE AND METHOD FOR TRANSMITTING AND RECEIVING INFORMATION BY BRAILLE

(71) Applicant: Fedor Valentinovich Belomoev, St. Petersburg (RU)

(72) Inventor: Fedor Valentinovich Belomoev, St. Petersburg (RU)

( * ) Notice: Subject to any disclaimer, the term of this patent is extended or adjusted under 35 U.S.C. 154(b) by 0 days.

(21) Appl. No.: 15/958,917

(22) Filed: Apr. 20, 2018

(65) Prior Publication Data

US 2018/0307313 A1  Oct. 25, 2018

Related U.S. Application Data

(63) Continuation of application No. PCT/RU2016/000651, filed on Sep. 30, 2016.

(30) Foreign Application Priority Data

Oct. 22, 2015 (RU) ................................ 2015145559

(51) Int. Cl.
*G06F 3/01* (2006.01)
*G09B 21/00* (2006.01)
(Continued)

(52) U.S. Cl.
CPC ........... *G06F 3/014* (2013.01); *G09B 21/004* (2013.01); *G09B 21/025* (2013.01); *G09B 21/04* (2013.01); *H04W 4/80* (2018.02)

(58) Field of Classification Search
CPC combination set(s) only.
See application file for complete search history.

(56) References Cited

U.S. PATENT DOCUMENTS 5,571,020 A * 11/1996 Troudet ................. G09B 5/065
2/160
2006/0134586 A1 * 6/2006 Armingaud .......... G09B 21/003
434/113
(Continued)

FOREIGN PATENT DOCUMENTS

GB 2254911 A 10/1992
RU 2141685 C1 11/1999
(Continued)

OTHER PUBLICATIONS

International Search Report dated May 18, 2017 in connection with International Application No. PCT/RU2016/000651, 2 pages.
(Continued)

*Primary Examiner* — Nabil H Syed
*Assistant Examiner* — Cal J Eustaquio
(74) *Attorney, Agent, or Firm* — Baker & McKenzie LLP

(57) ABSTRACT

The present disclosure relates to a device in the form of a glove for receiving and transmitting information using Braille comprising contact groups, and to a method for receiving and transmitting information using said device by visually, hearing and voice-impaired people. The device is made of, for example, textile material and comprises contact groups which, when put in contact with each other, generate and transmit signals defined as raised dots in Braille, and vibration signal devices used for receiving signals defined as raised dots in Braille. The device may comprise a control unit for analysis and conversion of data as well as transmitting and receiving signals connected by wires to the contact groups and vibration signal devices. The method for receiving and transmitting information is performed using the device connected to a computer or smartphone having software installed for converting Braille characters into the alphabet or voice and backwards.

13 Claims, 4 Drawing Sheets

(51) Int. Cl.
*G09B 21/02* (2006.01)
*G09B 21/04* (2006.01)
*H04W 4/80* (2018.01)

(56) References Cited

U.S. PATENT DOCUMENTS

2010/0134327 A1\* 6/2010 Dinh .................. G06F 3/014
    341/20
2014/0134575 A1   5/2014 Kim

FOREIGN PATENT DOCUMENTS

| SU | 296311 A3 | 2/1971 |
| WO | 9608804 A1 | 3/1996 |
| WO | 2012054443 A1 | 4/2012 |

OTHER PUBLICATIONS

Written Opinion of the International Searching Authority dated May 18, 2017 in connection with International Application No. PCT/RU2016/000651, 4 pages.
Extended European Search Report dated Apr. 9, 2019 in connection with European Application No. 16857873.0, 5 pages.

\* cited by examiner

DEVICE AND METHOD FOR TRANSMITTING AND RECEIVING INFORMATION BY BRAILLE

CROSS-REFERENCE TO RELATED APPLICATIONS

This application is a continuation application of International Application No. PCT/RU2016/000651 filed Sep. 30, 2016, which claims priority to Russian Patent Application No. 2015145559 filed Oct. 22, 2015, the contents of which are hereby expressly incorporated by reference in their entirety, including the contents and teachings of any references contained therein.

FIELD OF THE DISCLOSURE

The present disclosure relates to information technologies and can be used in the course of tactile transmitting and receiving of information encoded by the tactile raised dots system of Louis Braille using computers, mobile- or smartphones, electronic devices, recorders and control systems to expand communication abilities and limits for people with impaired vision, hearing and/or speech. In particular, the present invention is a device in the form of gloves having contact groups used to generate transmission signals defined as raised dots in Braille, and vibration signal devices used for receiving signals, defined as raised dots in Braille. This device is used according to a method of the present invention of transmitting and receiving information using Braille.

BACKGROUND OF THE DISCLOSURE

At present, Braille display devices are usually used for transmitting and receiving information by blind or visually impaired people. Refreshable Braille displays are electro-mechanical devices that form dots of Braille characters on a flat surface, which can be read by tactile receptors on the tips of fingers. These devices operate as keyboards having a software, manual controllers and actuators connected as an additional device to a computer via USB or Bluetooth interface. However, such devices are very expensive and cumbersome, and they do not allow for mobile and situational communication of visually, hearing and voice impaired people to other people.

U.S. Pat. No. 5,571,020 discloses an education device for assisting in the learning of keyboarding. The device includes sets of gloves and indicia applied to the fingers of the gloves to provide pictorial and alphanumeric representations of the computer keyboard. The visual and tactile memorization of the glove images are complemented by auditory and associative memorization provided by a story-telling educational method. However, the disclosed device is not intended for communication of visually, hearing and voice impaired people to other people using Braille, and does not allow for such communication.

The closest analogue of the inventions disclosed herein is an information input device and method disclosed in the patent of the Russian Federation No. 2141685. The described device comprises tactile elements placed on a support and connected to the controller, wherein at least one tactile member is disposed and fixed on at least one phalanx of at least one finger by the support, i.e., flexible or elastic one, and the tactile element is disposed in the area of access of the terminal phalanx of the thumb of the same hand. Thus, tactile elements with conductive coating are arranged as a Braille information matrix and comprise tactile sensitivity sensors, such as electromagnetic vibration devices, facing the skin surface of the fingers. The described apparatus is quite complicated since it contains Braille matrix within each of the tactile elements, while receiving information using such matrixes does not provide a clear interpretation of the received information.

SUMMARY OF THE DISCLOSURE

An object of the present invention is to provide a device for transmitting and receiving information by braille which is compact, easy to manufacture and use, and available for visually, hearing and voice impaired people.

This goal was achieved by providing a device in the form of a glove, wherein data are transmitted using a contact method and received via a tactile method. The described device is used in a method of transmitting and receiving data using Braille according to the present invention.

The device is simple and easy to use. It allows for communication of visually, hearing and voice impaired people to other people, particularly mobile and situational communication using a smartphone.

An embodiment of the present invention is a device in the form of a glove for receiving and transmitting information using Braille having contact groups, which contact with each other to generate and transmit signals defined as raised dots in Braille, and vibration signal devices used for receiving signals defined as raised dots in Braille. The contact groups of the device are made of conductive material.

In some embodiments, the device of the present invention comprises contact groups which are used for generating and transmitting signals and are located on the fingertips and on the palm.

In some embodiments, the device of the present invention comprises two additional contact groups located on the outer side of the index finger.

In some embodiments, the device of the present invention comprises vibration signal devices used for receiving signals which are located on the rear side of distal phalanxes and on the rear side of hand.

In some embodiments, the device of the present invention comprises a fixing member located on the wrist.

Another embodiment of the present invention is a method of transmitting and receiving information by Braille using the above-disclosed device of the present invention, comprising steps of generating transmitted signals, defined as raised dots in Braille, which are formed by sequential or simultaneous formation of corresponding contacts between contact groups of the device; converting the received signals into vibration of corresponding vibration signal devices of the device; and converting Braille characters into the alphabet or voice and backwards by software installed onto computer or smartphone connected to the device.

Another embodiment of the present invention is a device in the form of a glove for receiving and transmitting information using Braille disclosed above, additionally comprising a control unit for analysis and conversion of data as well as transmitting and receiving signals, connected by wires to contact groups and vibration signal devices.

In some embodiments of the device of the present invention, the control unit is configured to connect to a computer or a smartphone for receiving and transmitting information by wires or via a wireless connection.

In some embodiments of the device, receiving and transmitting information is provided by Bluetooth or Wi-Fi.

Another embodiment of the present invention is a method of transmitting and receiving information by Braille using the above-disclosed device of the present invention, comprising steps of generating transmitted signals, defined as raised dots in Braille, which are formed by sequential or simultaneous formation of corresponding contacts between contact groups of the device; converting the received signals into vibration of corresponding vibration signal devices of the device; providing transmitting and receiving signals between the device and a computer or a smartphone via the control block.

In some embodiments of the method of the present invention, convention of Braille characters into alphabet or voice and backwards is provided by software installed into the computer or the smartphone.

In some embodiments of the method of the present invention, the control unit is connected to the compute or the smartphone by wires of via a wireless connection.

In some embodiments of the method of the present invention, the control unit is connected to the compute or the smartphone by Bluetooth or Wi-Fi.

In some embodiments, a device is provided in the form of a glove for receiving and transmitting information using Braille, the device comprising: contact groups positioned on an inner side of five fingers and palm, of a hand, and used for transmitting signals, where one connection between different contact groups is defined as one raised dot in Braille; and vibration signal devices positioned on a rear side of distal phalanxes of the five fingers and on a rear side of the hand and used for receiving signals, where one vibration signal transmitted to a specific finger of the rear side of the hand corresponds to one in Braille.

In some embodiments, the different contact groups used for transmitting signals are located on fingertips and the palm of the hand.

In some embodiments, the device comprises two additional contact groups located on an outer side of an index finger.

In some embodiments, the contact groups are made of conductive material.

In some embodiments, the device comprises a fixing member located on a wrist.

In some embodiments, the device comprises a control unit for analysis and conversion of data as well as transmitting and receiving signals, connected by wires to the contact groups and the vibration signal devices.

In some embodiments, the control unit is configured to connect to a computer or a smartphone for receiving and transmitting information by the wires or via a wireless connection.

In some embodiments, receiving and transmitting the information is provided by Bluetooth or Wi-Fi.

In some embodiments, a method is provided for transmitting and receiving information by Braille using a device, the method comprising: generating transmitted signals, defined as or associated with raised dots in Braille, formed by sequential or simultaneous formation of corresponding contacts between contact groups of the device; converting received signals, defined as or associated with the raised dots in Braille, into vibrations of corresponding vibration signal devices of the device; and converting Braille characters into alphabets or voice, or vice versa, by code installed onto a computer or a smartphone connected to the device.

In some embodiments, a method is provided for transmitting and receiving information by Braille using a device, the method comprising the following: generating first signals, defined by a control unit as raised dots in Braille, by sequential or simultaneous formation of corresponding contacts between contact groups of the device; converting the first or second signals, defined by the control unit as the raised dots in Braille, into vibrations of corresponding vibration signal devices of the device; and providing the first or the second signals between the device and a computer or a smartphone by the control unit.

In some embodiments, conversion of Braille characters into alphabets or voice, or vice versa, is provided by code installed onto the computer or the smartphone connected to the device.

In some embodiments, the control unit is configured to connect to the computer or the smartphone for receiving and transmitting information by wires or via a wireless connection.

In some embodiments, the control unit is configured to connect to the computer or smartphone by Bluetooth or Wi-Fi.

DETAILED DISCLOSURE

The device of the present invention applies a contact method to transmit data and a tactile method to receive data. To transmit data using the contact method, it is not required to use tactile sensations. Additionally, to receive data using the tactile method, attention to the raised dots texture is not required. Data are transmitted through free, sequential or simultaneous connection of contacts disposed on a glove worn on a hand. Backward data are received by the perception of vibrations produced by vibration signal devices.

Figure 1:
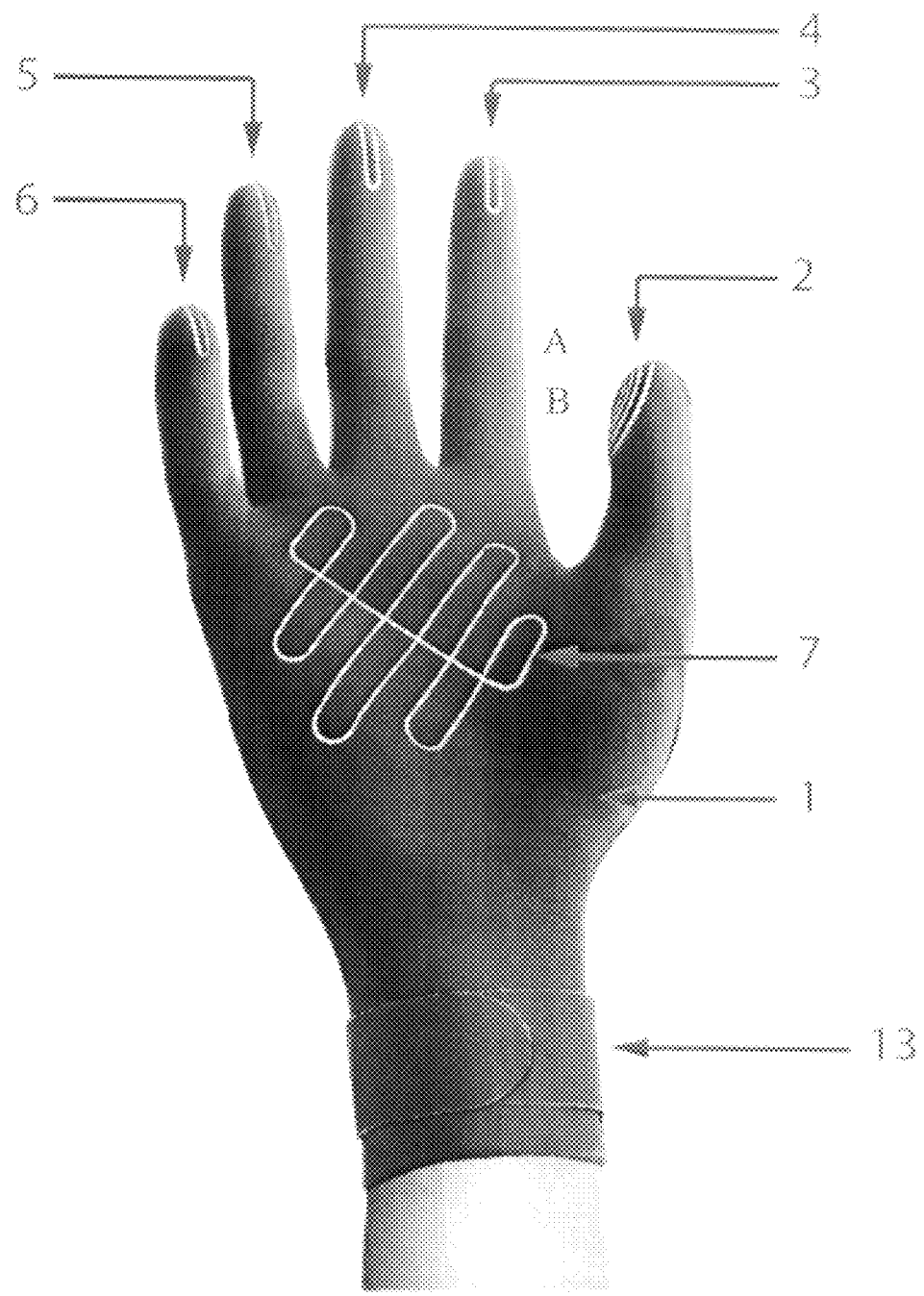
FIG. 1 depicts a scheme of placing the contact groups of the device and fixing a member on the wrist. Contact groups (2) to (7) are used for sequential formation of contacts, which correspond to raised dots in Braille. The optional additional contact groups (A) and (B), located on the outer side of the index finger, can be used in the simultaneous formation of contacts.
Figure 2:
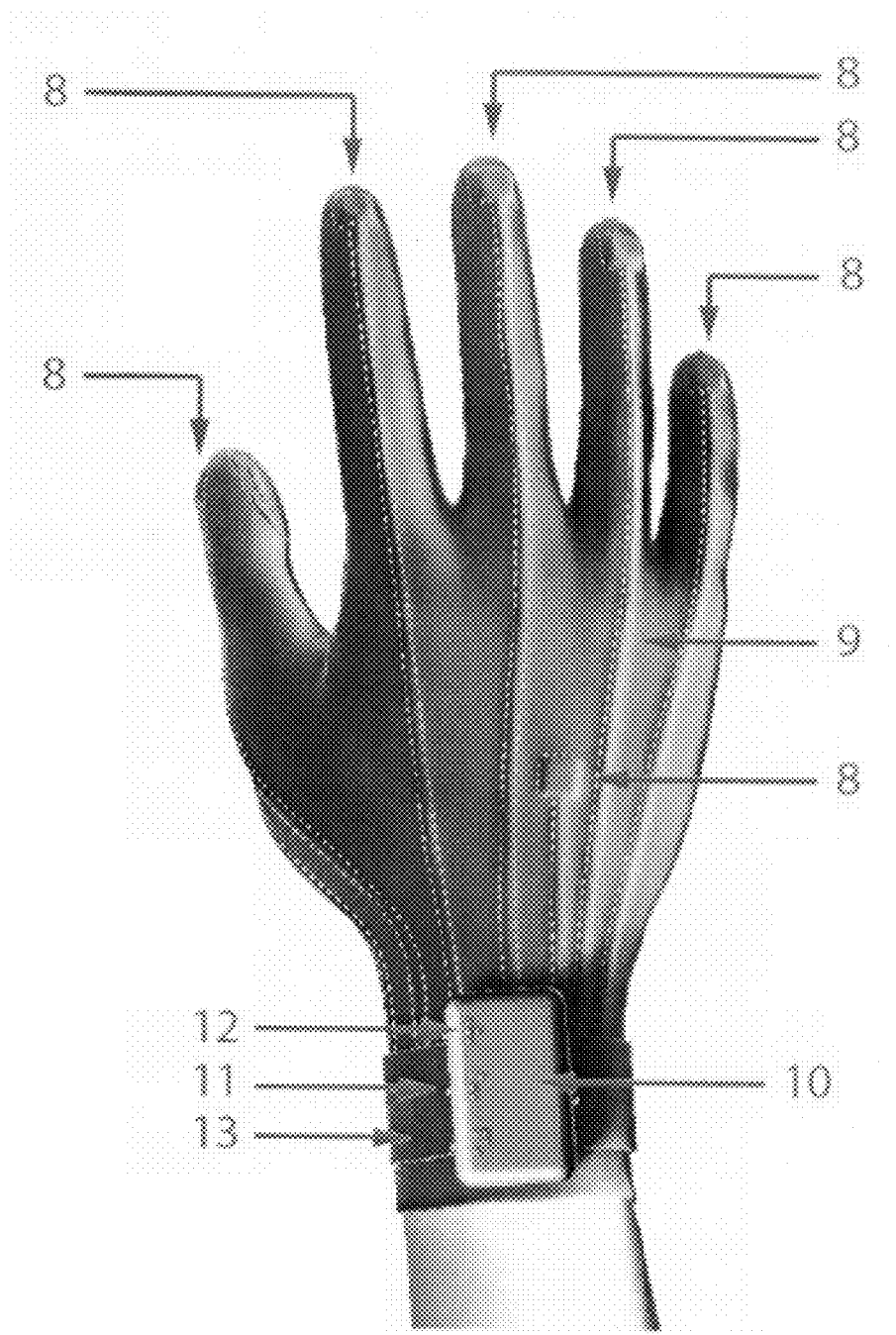
FIG. 2 depicts a scheme of placing vibration signal devices and a control unit connected to the vibration signal devices by wires.

The non-limiting embodiment of the device of the present invention is depicted on FIGS. 1 and 2.

The device is made in the form of a glove (1), preferably of textile or another suitable non-conductive material. The device comprises contact groups made of a conductive material (FIG. 1). The contact groups are located on the thumb (2), the index finger (3), the middle finger (4), the ring finger (5), the little finger (6), and the palm (7). Contact groups (2)-(6) are preferably located on the fingertips. These contact groups are used for sequential formation of contacts between the contact groups of the device corresponding to the raised dots of Braille.

In some embodiments, the device of the present invention may further comprise two additional contact groups (A) and (B), located on the outer side of the index finger. These contact groups, along with the other contact groups, may be used for the simultaneous formation of contacts between the contact groups of the device corresponding to the raised dots in Braille.

The principle of consistency between these contacts and raised dots of Braille is disclosed in detail below in the course of describing the method of the present invention.

The device further comprises vibration signal devices (8), which provide receiving information (FIG. 2). The vibration signal devices (8) are preferably located on the rear side of the distal phalanx and on the rear side of the hand.

In some embodiments, the device of the present invention comprises a fixing member (13), located on the wrist.

The contact groups and vibration signal devices are connected to a computer or a smartphone having software which matches the transmitted signals from the contact groups with the raised dots of Braille and provides conversion of Braille characters into the alphabet or voice. It also provides backward conversion of the alphabet or voice into Braille characters followed by sending signals to the corresponding vibration signal devices.

The principle of consistency between these vibration signal devices and raised dots in Braille is disclosed in detail below.

In one of the most preferable embodiments, the device comprises a control unit (10) for analysis and conversion of data connected by wires (9) to contact groups and vibration signal devices (8), and comprising settings buttons (11) and raised dots (12) indicating the settings buttons (FIG. 2).

In the most preferable embodiment, the device is connected to a computer or, preferably, to a smartphone for transmitting and receiving signals via a wireless connection. Transmitting and receiving signals between the device and the computer or the smartphone is provided by Bluetooth or Wi-Fi. In the most preferable embodiment, the control unit (10) located on the device of the present invention converts transmitted signals generated by the contact groups into Braille raised dots, sends this information to the computer or the smartphone, receives backward information from the computer or the smartphone, and sends signals to the vibration signal devices corresponding to the specific Braille raised dots. Conversion of the alphabet or voice into Braille characters and backward convention are performed by the software installed onto the computer or the smartphone.

Using a portable smartphone allows for a simple and easy method of receiving and transmitting information, and provides for mobile and situational communication of visually, hearing and/or voice impaired people to other people.

The device according to the present invention operates as follows:

Transmitted letters or digital signals defined as Braille raised dots are generated and transmitted by pointwise sequential or simultaneous formation of appropriate contacts between the contact groups of the device located on the fingertips and palm of the glove. Connection of specific contact groups denotes a certain point in a symbol, sign or letter of a Braille character. It is possible to use any known consistencies between the Braille characters and the letters and numbers of all possible keyboard layouts and languages, including languages using Latin, Cyrillic or other characters.

Figure 3:
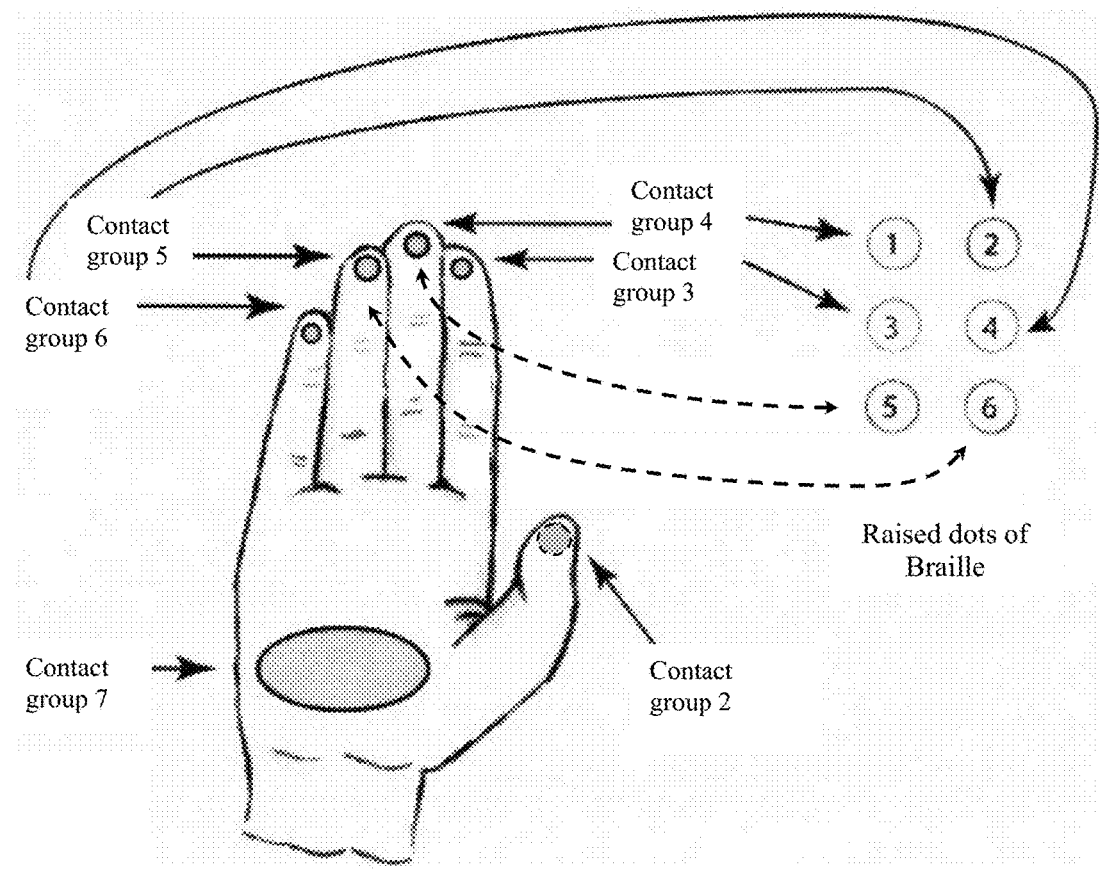
FIG. 3 depicts the consistency between the contacts and raised dots in Braille in the course of sequential contact formation.

In some embodiments of the method of the present invention, when signals defined as Braille raised dots are generated and transmitted sequentially, formation of the contact between contact group (4) of the middle finger and contact group (7) on the palm corresponds to dot 1. Formation of contact between contact group (5) of the ring finger and contact group (7) on the palm corresponds to dot 2. Formation of contact between contact group (3) of the index finger and contact group (7) on the palm corresponds to dot 3. Formation of contact between contact group (6) of the little finger and contact group (7) on the palm corresponds to dot 4. Formation of contact between contact group (4) of the middle finger and contact group (2) of the thumb corresponds to dot 5 and, finally, formation of contact between contact group (5) of the ring finger and contact group (2) of the thumb corresponds to dot 6 (see, FIG. 3).

Figure 4:
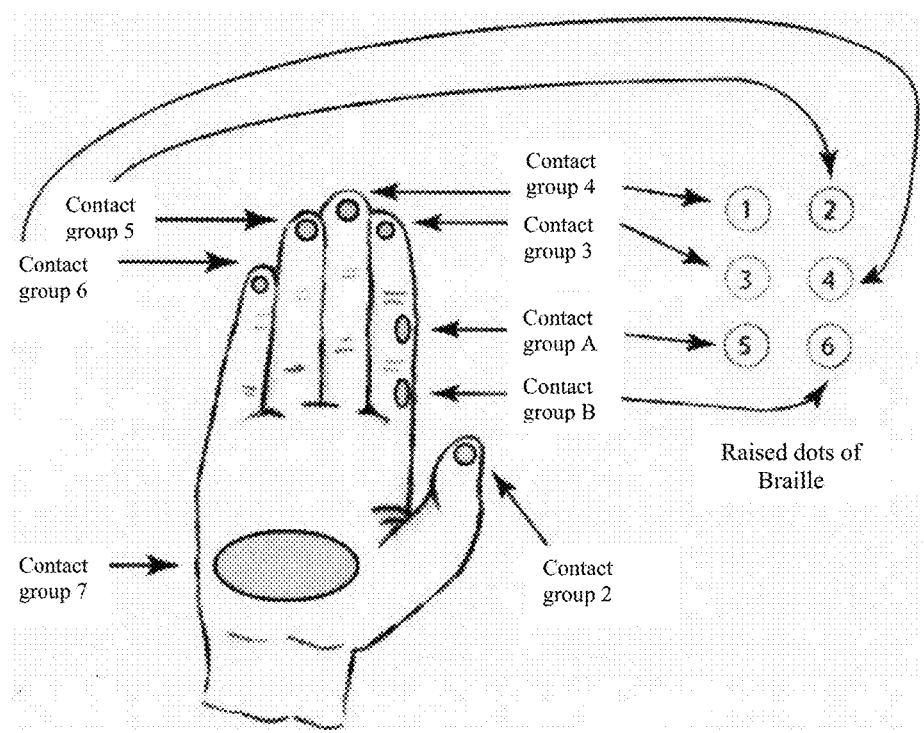
FIG. 4 depicts the consistency between the contacts and raised dots in Braille in the course of simultaneous contact formation.

In some embodiments of the method of the present invention, when signals defined as Braille raised dots are generated and transmitted simultaneously, formation of contact between contact group (4) of the middle finger and contact group (7) on the palm corresponds to dot 1. Formation of contact between contact group (5) of the ring finger and contact group (7) on the palm corresponds to dot 2. Formation of contact between contact group (3) of the index finger and contact group (7) on the palm corresponds to dot 3. Formation of contact between contact group (6) of the little finger and contact group (7) on the palm corresponds to dot 4. Formation of contact between contact group (A) on the outer side of the index finger and contact group (2) on the thumb corresponds to dot 5. Formation of contact between contact group (B) on the outer side of the index finger and contact group (2) of the thumb corresponds to dot 6 (see, FIG. 4). Said configuration allows simultaneous formation of contact between contact groups (A) and (B), and the contact group (2) of the thumb for simultaneous formation signal of dots 5 and 6 of a Braille character, thus allowing the composition of a Braille character comprising both dot 5 and dot 6.

For instance, in order to generate character «A» of Braille in either Latin or Cyrillic, one must touch contact group (7) on the palm by contact group (4) of the middle finger. In order to generate character «C» of Braille in Latin, one must touch contact group (7) on the palm by contact groups (4) and (5) of the middle and ring fingers. In order to generate character «C» of Braille in Cyrillic, one must touch contact group (7) on the palm by contact groups (5) and (3) of the ring and index fingers, and either touch contact group (A) on the outer side of the index finger by contact group (2) of the thumb, if the character «C» is generated simultaneously, or touch contact group (4) of the middle finger by contact group (2) of the thumb if the «C» is generated sequentially.

After transmitting a Braille character, the signal of the Braille character is converted to the corresponding alphabet letter and then displayed visually on a computer monitor or a smartphone screen as a letter of the corresponding language (Russian, English, etc.). Further, it is possible to convert the entered text into a voice message using the corresponding software installed on the computer or the smartphone.

In some embodiments of the method of the present invention, when information in the form of text on a monitor of a computer or screen of a smartphone, or voice of a person communicating to a user of the device of the present invention is transferred to the user, the received signals defined as Braille raised dots are converted into vibrations of the corresponding vibration signal devices, which are located on the rear side of the distal phalanxes and on the rear side of the hand (See, FIG. 2). The vibration signal device of the middle finger corresponds to dot 1. The vibration signal device of the ring finger corresponds to dot 2. The vibration signal device of the index finger corresponds to dot 3. The vibration signal device of the little finger corresponds to dot 4. The vibration signal device of the thumb corresponds to dot 5, and the vibration signal device on the rear side of hand corresponds to dot 6.

While the present inventions are described in detail above, one skilled in the art will recognize that modifications and equivalent substitutions can be made, and such modifications and substitutions are within the scope of the present inventions defined by the appended claims.

The invention claimed is:

1. A device in the form of a glove for receiving and transmitting information using Braille, the device comprising:
   contact groups positioned on an inner side of five fingers and a palm, of a hand, and used for transmitting signals, where one connection between different contact groups is defined as one raised dot in Braille; and
   vibration signal devices positioned on a rear side of distal phalanxes of the five fingers and on a rear side of the hand and used for receiving signals, where one vibration signal transmitted to a specific finger of the rear side of the hand corresponds to one in Braille.

2. The device of claim 1, wherein the contact groups used for transmitting signals are located on fingertips and the palm of the hand.

3. The device of claim 1, comprising two additional contact groups located on an outer side of an index finger.

4. The device of claim 1, wherein the contact groups are made of conductive material.

5. The device of claim 1, wherein the device comprises a fixing member located on a wrist.

6. The device of claim 1, comprising a control unit for analysis and conversion of data as well as transmitting and receiving signals, connected by wires to the contact groups and the vibration signal devices.

7. The device of claim 6, wherein the control unit is configured to connect to a computer or a smartphone for receiving and transmitting information by the wires or via a wireless connection.

8. The device of claim 7, wherein receiving and transmitting the information is provided by Bluetooth or Wi-Fi.

9. A method of transmitting and receiving information by Braille using a device, the method comprising the following:
   generating transmitted signals, formed by sequential or simultaneous formation of corresponding contacts between contact groups of the device, wherein one connection between different contact groups of the device is defined as one raised dot in Braille;
   converting received signals, defined as or associated with the raised dots in Braille, into vibrations of corresponding vibration signal devices of the device, wherein a vibration of the vibrations corresponds to the one raised dot in Braille; and
   converting Braille characters into alphabets or voice, or vice versa, by code installed onto a computer or a smartphone connected to the device.

10. A method of transmitting and receiving information by Braille using a device, the method comprising the following:
    generating first signals, by sequential or simultaneous formation of corresponding contacts between contact groups of the device, wherein one connection between different contact groups of the device is defined as one raised dot in Braille;
    converting the first or second signals, defined by the control unit as the raised dots in Braille, into vibrations of corresponding vibration signal devices of the device, wherein a vibration of the vibrations corresponds to the one raised dot in Braille; and
    providing the first or the second signals between the device and a computer or a smartphone by the control unit.

11. The method of claim 10, wherein conversion of Braille characters into alphabets or voice, or vice versa, is provided by code installed onto the computer or the smartphone connected to the device.

12. The method of claim 10, wherein the control unit is configured to connect to the computer or the smartphone for receiving and transmitting information by wires or via a wireless connection.

13. The method of claim 12, wherein the control unit is configured to connect to the computer or smartphone by Bluetooth or Wi-Fi.

* * * * *